United States Patent [19]

Srivastava

[11] 3,760,356

[45] Sept. 18, 1973

[54] TECHNIQUE FOR DETERMINING THE EXTREME BINARY NUMBER FROM A SET OF BINARY NUMBERS

[75] Inventor: Keshava Srivastava, Oklahoma City, Okla.

[73] Assignee: Honeywell Information Systems, Inc., Waltham, Mass.

[22] Filed: Dec. 17, 1971

[21] Appl. No.: 209,051

[52] U.S. Cl. . 340/146.3 Y, 235/92 EA, 235/92 SH, 235/92 NG

[51] Int. Cl. ........................... G06k 9/00, G06f 7/38

[58] Field of Search .................. 340/146.3, 146.3 Y, 340/146.3 Q, 146.3 R; 235/92 EA, 92 SH, 92 NG

[56] References Cited

UNITED STATES PATENTS

| | | | |
|---|---|---|---|
| 3,618,016 | 11/1971 | Van Steenis | 340/146.3 Y |
| 3,496,543 | 2/1970 | Greenly | 340/146.3 H |
| 3,612,836 | 10/1971 | Jordan et al. | 235/92 EA |
| 3,164,805 | 1/1965 | Holt et al. | 340/146.3 R |

*Primary Examiner*—Maynard R. Wilbur
*Assistant Examiner*—Leo H. Boudreau
*Attorney*—Ronald Reiling

[57] ABSTRACT

A technique is disclosed wherein the extreme number from a set of binary numbers is determined. Each number of the set is augmented until one number from the set reaches a predetermined amount. Detector logic associated with the one number is enabled resulting in operations which identify both the extreme number and its address in the set. Also determined is the original value of the extreme number. Further enhancements to the technique of the invention include identification of the next extreme number and the difference between the extreme number and the next extreme number.

7 Claims, 3 Drawing Figures

TECHNIQUE FOR DETERMINING THE EXTREME BINARY NUMBER FROM A SET OF BINARY NUMBERS

BACKGROUND OF THE INVENTION

1. Field of the Invention

This invention relates generally to digital decoder apparatus and specifically to apparatus for determining the extreme number of a plurality of numbers in binary code.

2. Prior Art

There are many instances where a set of numbers have been computed and it is necessary to determine which one of the set of numbers is the extreme. For example, in a matrix matching computation for optical character recognition systems, a plurality of templates, each template representing a unique alpha-numeric character, are matched to an unknown sensed character desired to be determined. The coincidence of indicia in each template to the unknown character provides a set of random binary numbers. The template associated with the highest number of the set of random numbers in all probability matches most nearly the unknown sensed character. Hence, a determination of the highest number indicates that its associated template is the symbol corresponding to the unrecognized character. Obviously, if non-coincidence of indicia were counted, the lowest number would be determined to indicate the unrecognized character.

In order to identify which number is the extreme of a plurality of numbers, the prior art used two basic techniques. Both techniques involved only an extreme highest number. The first method involved an integrating capacitor which is incremented each time an input signal is applied to it. The charge established on the integrating capacitor provides an output signal whose magnitude corresponds to the total number of input signals. The capacitor with the greatest quantity of charge represents the highest source.

The second technique of the prior art involves logic circuitry which compares each binary number of a set of binary numbers in order to determine the highest binary number. It has been found that the implementation for such a comparison requires a high amount of logic circuitry.

OBJECTS OF THE INVENTION

It is therefore a primary object of the invention to provide an improved detector technique for identifying the extreme number from a set of binary numbers, which technique is more reliable and lower in cost than techniques of the prior art.

It is another object of the invention to provide with such detector technique a collateral technique for determining the address of such extreme number.

It is yet another object of the invention to provide with such detector technique a capability for determining the original value of the extreme number.

SUMMARY OF THE INVENTION

The invention illustrates a technique for identifying an extreme number in a set of binary numbers. For purposes of illustration, the technique elucidates only a determination of an extreme highest number. However, it is understood that it could easily be modified to elucidate a determination of an extreme lowest number. In the preferred embodiment a source of random numbers presets a plurality of counter means such that each counter means has one random number. Means are then enabled which increment each of the preset counter means until one of the counter means reaches a predetermined number. Detector means are then enabled to indicate that the highest number has been diagnosed. Further enhancements include identifying the address corresponding to the highest number; determining the preset value of the highest number; and, determining whether there is more than one highest number.

BRIEF DESCRIPTION OF THE DRAWINGS

The novel features which are characteristic of this invention are set forth with particularity in the appended claims. The invention itself, however, both as to its organization and method of operation together with further objects and advantages thereof may best be understood by reference to the following description taken in connection with the accompanying drawings in which:

DETAILED DESCRIPTION OF THE PREFERRED EMBODIMENT

Figure 1:
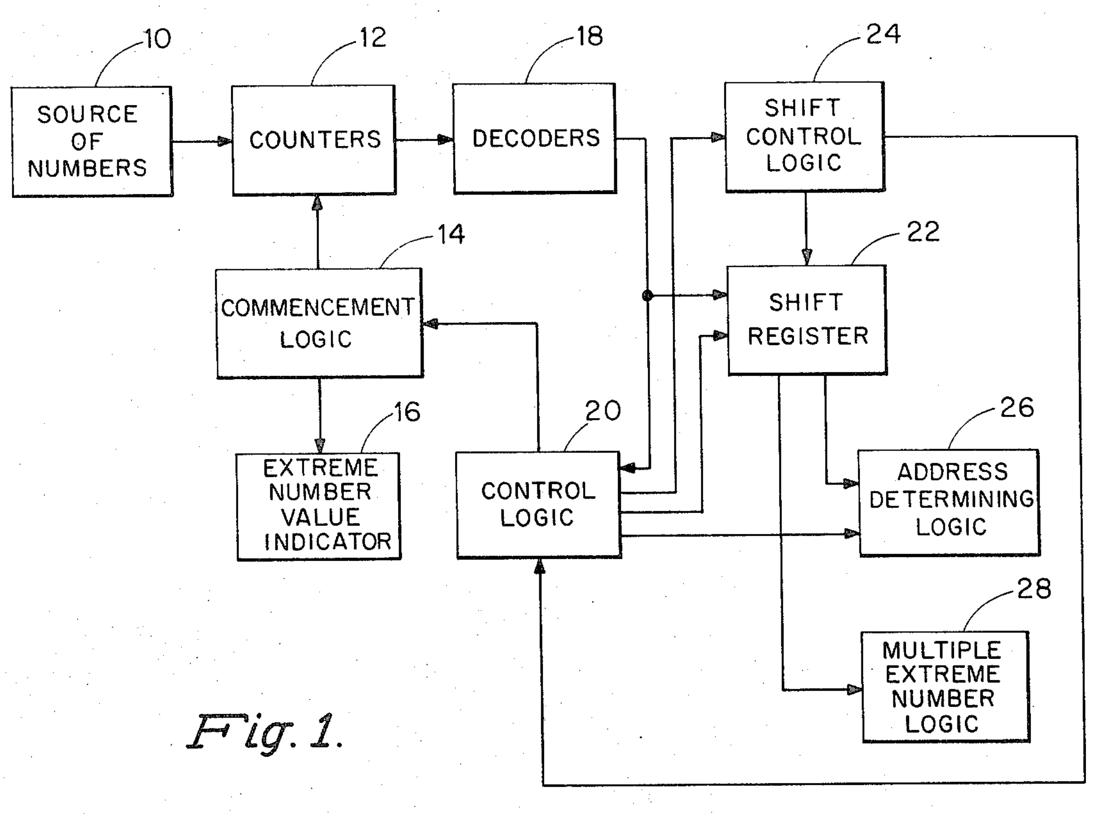
FIG. 1 is a general block diagram illustrating a preferred embodiment of the invention.

FIG. 1 illustrates a source 10 which provides information in the form of a set of random numbers to counters 12. Once counters 12 have been preset, commencement logic 14 is enabled and supplies a series of pulses both to counters 12 and also to extreme number value indicator 16. Each pulse of the series of pulses augments, i.e. either increments or decrements, counters 12 and indicator 16. When one counter reaches a predetermined number, a detector 18 is enabled. The output of detector 18 is transmitted to control logic 20 which implements three simultaneous operations. First, the commencement logic 14 is disabled. Indicator 16 now computes the original preset value. Second, shift register 22 is signaled such that it indicates the outputs of detector 18. Third, a shift control logic 24 is enabled which then provides for the shifting of the entire contents of shift register 22. Connected to the shift register 22 is address determination logic 26 which identifies the counter which was preset to the extreme number. Also connected to the shift register 22 is a multiple extreme number logic 28 which indicated whether there has been more than one extreme number.

Figure 2:
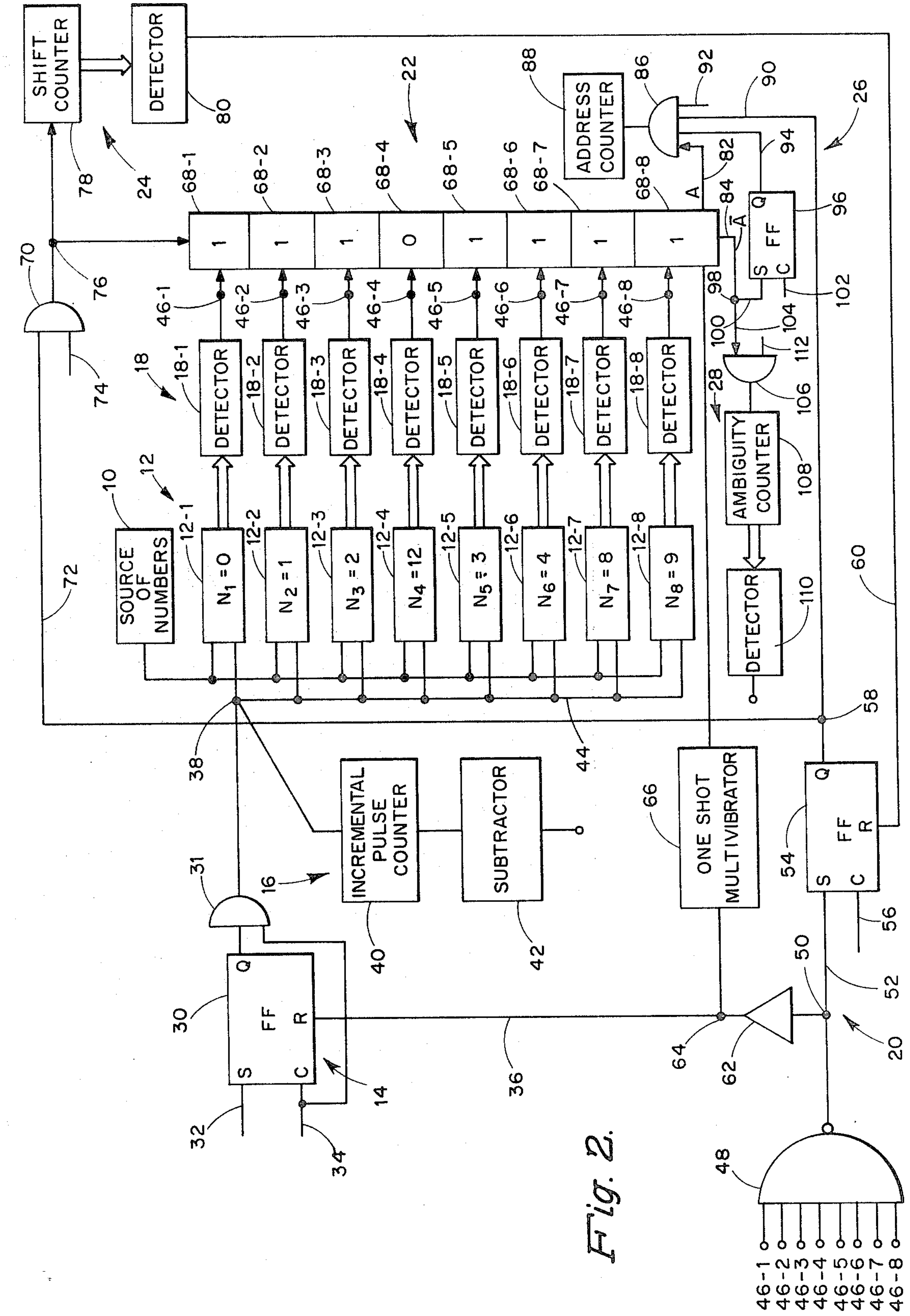
FIG. 2 is a more detailed schematic block diagram further illustrating the preferred embodiment of FIG. 1.

Referring now in greater detail to FIG. 2 wherein similar reference characters refer to similar parts, a source 10 is shown as the source of the set of random numbers. The origin of the data is not important for purposes of this invention, but may, for example, be provided from certain types of investigatory and experimental work where a set of unknown data is generated. The output of source 10, i.e. the set of binary numbers, is transmitted to a plurality of binary counters 12 either in series or parallel as is well known in the art. The number of counters may be equal to the set of numbers to be checked. For purposes of illustration, the extreme of eight binary numbers will be determined in which case only eight binary counters 12–1 to 12–8 are required. For exemplary purposes, the extreme number will hereinafter be referred to as the highest number. It is understood that the extreme number could just as easily be chosen to be the lowest number. The capacity of each binary counter must be greater than the highest binary number transmitted from source 10. If it is assumed for purposes of illustration that the numbers from source 10 will never be greater than twelve, then the capacity of binary counters 12 is made equal to a four digit counter.

Coupled to the binary counters 12–1 to 12–8 are detectors 18–1 to 18–8, respectively. The detectors are set to a value which is higher then the highest output binary counter 12 receives from source 10. Stated differently, a detector is never enabled by the random numbers preset in binary counters 12. In the preferred illustration, each detector is enabled when the number in an associated binary counter reaches 15.

Once counters 12 have been preset, the commencement logic 14, shown in FIG. 1, is empowered. Commencement logic 14 includes a flip-flop 30 which has three input connections and one output connection. Line 32 is connected at one end to the set input of flip-flop 30 and at its other end to a computation block (not shown) of a computer (not shown). Line 32 is energized when a start maximization signal is generated. This signal occurs only after the binary counters 12 have received their preset numbers from source 10. Line 34 is connected at one end to a clock input of flip-flop 30 and its other end to a master clock (not shown) associated with a computer. The master clock has pulses with two phases, referred to hereinafter as a positive clock pulse, shown in FIG. 3A, representing a first phase and a negative clock pulse, shown in FIG. 3B, representing the second phase. When the inputs to lines 32 and 34 are both positive, i.e., when line 32 has received a start maximization signal and line 34 has received a positive clock pulse, flip-flop 30 changes its state and provides a series of pulses at the positive clock pulse rate to its output. The third input connection to flip-flop 30 is via line 36 which resets flip-flop 30 thereby terminating the output pulses from flip-flop 30.

Flip-flop 30 is connected to incremental pulse counter 40 via junction 38. Incremental pulse counter 40 is set to zero by well-known means before the set of binary numbers is introduced into the binary counters 12. With each pulse that is generated into junction 38, incremental pulse counter 40 is incremented by one. In the preferred embodiment, pulse counter 40 is a four digit binary counter but its capacity may be less than the capacity of binary counters 12, the limitation being that it must be large enough to insure that one of the binary counters 12 is full. Pulse counter 40 is connected to subtractor 42. Subtractor 42 contains a predetermined number which is identical to the number which enables the detector 18. When subtractor 42 receives a binary number from incremental pulse counter 40, it performs a subtract operation. The difference between the predetermined number and the number received from pulse counter 40 corresponds to the highest preset number transmitted to binary counters 12.

Also connected to junction 38 is bus line 44 which is coupled to binary counters 12–1 to 12–8. With each pulse delivered to bus line 44, binary counters 12 are incremented. When one of the counters 12 is full, i.e. in the preferred illustration when one counter has reached a binary coded decimal fifteen, a detector 18 associated with that counter is enabled.

As was shown in FIG. 1, detectors 18 are connected to control logic 20. More specifically detectors 18 are connected to gate 48 via junctions 46–1 to 46–8. Gate 48 provides a binary ZERO output until one of the detectors 18 is enabled which results in gate 48 changing its output to a binary ONE signal.

Connected to gate 48 via junction 50 and line 52 is the set position of flip-flop 54. Flip-flop 54 has its clock position connected to line 56 which is connected to the master clock (not shown). Upon receiving a binary ONE signal from gate 48 and upon receiving a positive clock pulse from line 56, flip-flop 54 changes it state and provides pulses to junction 58 equal to the number of positive clock pulses. Also connected to flip-flop 54 at its reset position is line 60.

Junction 50 is additionally connected to the reset position of flip-flop 30 via inverter 62, junction 64 and line 36. When gate 48 changes its signal, flip-flop 30 is reset resulting in no further output pulses.

Junction 50 is further connected to shift register 22 vai inverter 62, junction 64 and one shot multivibrator 66. Shift register 22 comprises cells 68–1 to 68–8 which are coupled to detectors 18–1 to 18–8 via junctions 46–1 to 46–8 respectively. When the shift register 22 receives a signal from one shot multivibrator 66, each cell 68 indicates the binary state of an associated detector. If a highest number has been detected, all but one detector should provide a binary ONE signal in the cells 68. Thus in most instances only one detector provides a binary ZERO signal.

As was explained in FIG. 1, the shift control logic 24 is connected to control logic 20. More specifically gate 70 of shift control logic 24 is connected to flip-flop 54 via junction 58 and line 72. Gate 70 has a clock input via line 74. When gate 70 receives an input via line 72 and simultaneously receives a positive clock pulse via line 74, it is enabled to generate to junction 76 a series of pulses equal to the positive clock pulses.

Shift register 22 is connected to gate 70 via junction 76. The pulses provided by gate 70 make the shift register shift in a manner well known in the art. Thus each pulse from the output of gate 70 provides for the data stored in each cell 68 of the shift register 22 to be shifted to the next cell. This shift can be visualized as occurring in a direction from cell 68–1 toward cell 68–8.

Shift counter 78 is also connected to gate 70 via junction 76. Shift counter 78 has a capacity at least equal to the number of binary counters 12. In the preferred embodiment, there has been shown eight binary counters so shift counter 78 must have, at least, a three binary digit capacity. Each pulse received from gate 70 increases by one the count of shift counter 78. Detector 80 is connected to shift counter 78 and is enabled when count of shift counter 78 indicates that all binary counters 12 have been sampled. Detector 80 has its output connected to the reset position of flip-flop 54 via line 60 which results in flip-flop 54 terminating its output. This, in turn, affects the output of gate 70 such that there is no further shifting of shift register 22.

As was shown in FIG. 1, the output of shift register 22 is connected to address determination logic 26 and multiple extreme number logic 28. More specifically the output of the last cell, in this instance cell 68–8, is provided along either one of two paths. If cell 68–8 contains a binary ONE, a signal is provided over line 82. If cell 68–8 contains a binary ZERO, a signal is provided over line 84. These outputs from the shift register 22 are designated in FIG. 2 as A for a binary ONE and $\bar{A}$ for a binary ZERO.

The address determination logic 26 includes a gate 86 connected to shift register 22 via line 82 and an address counter 88 connected to the output of gate 86. Gate 86 has another input connected to flip-flop 54 via junction 58 and line 90. A third input to gate 86 is from line 92 which is connected to the master clock (not shown). The fourth input is connected via line 94 from a flip-flop 96. Each time a binary ONE is transmitted from cell 68–8, gate 86 is enabled providing an output pulse to address counter 88. Once a binary ZERO has been transmitted from cell 68–8, gate 86 will be rendered non-conductive because of the output from flip-flop 96. The number of pulses received by address counter 88 identifies the original position of the first highest number which, in most instances, is the only highest number.

The set position of flip-flop 96 is connected to cell 68–8 via line 84, junction 98 and line 100. The clock position of flip-flop 96 is connected to the master clock (not shown) via line 102. Flip-flop 96 is energized when a binary ZERO is transmitted from cell 68–8, and a negative clock pulse is received from the master clock (not shown). When energized, flip-flop 96 changes it output from a binary ONE signal to a binary ZERO signal which, as explained above, disables gate 86.

The multiple extreme number logic 26 of FIG. 1 is connected to shift register 22 via line 84, junction 98 and line 104. The multiple extreme number logic includes gate 106, ambiguity counter 108 and detector 110. Gate 106 receives a clock input from line 112 which is a negative clock pulse from the master clock (not shown). Each time a binary ZERO is transmitted from cell 68–8, gate 106 will be enabled delivering a pulse to ambiguity counter 108. If more than one binary ZERO signal is received by gate 106, i.e., if there are two highest numbers, ambiguity counter 108 provides an output signal via detector 110 which is transmitted by suitable means (not shown) to another portion of the computer. The computer checks whether the ambiguity counter has a number greater than one. If it does, then transmission of the signal from address counter 88 is blocked; if the output of ambiguity counter 108 is only a binary coded decimal one, the value in address counter 88 is sampled and it identifies the position of the source with the highest number.

Figure 3:
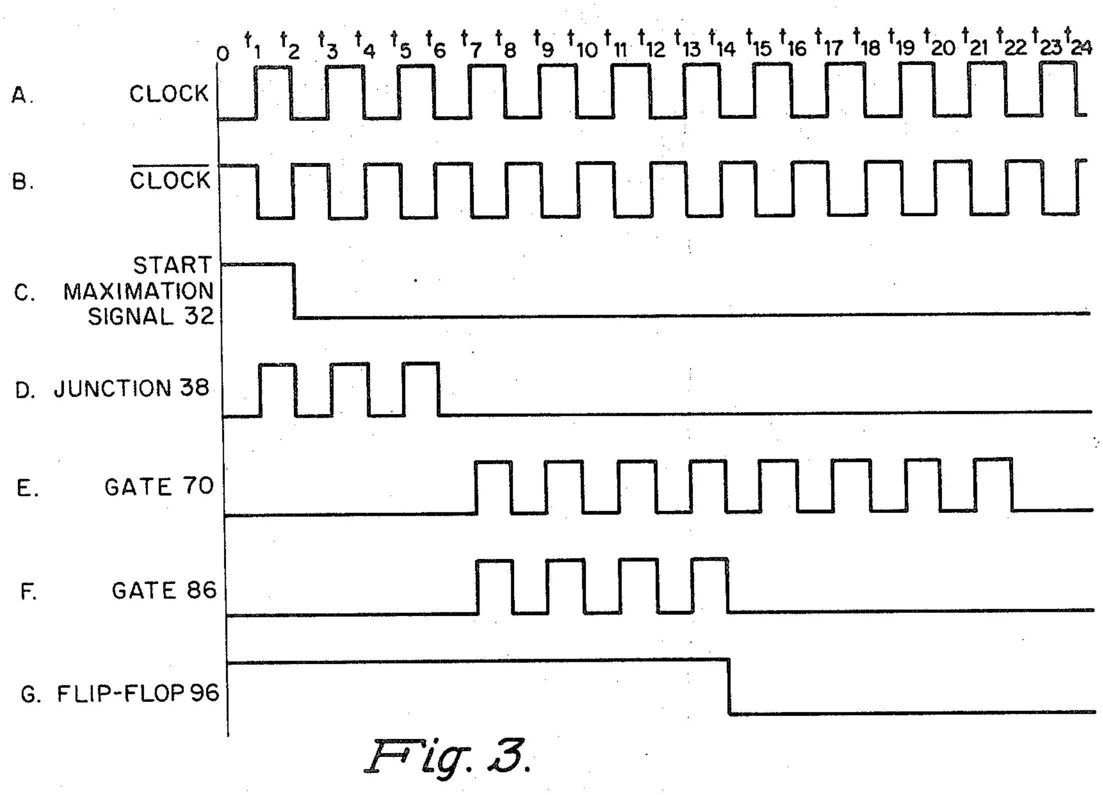
FIG. 3 is a time based diagram illustrating the operation of FIGS. 1 and 2.

The operation of the preferred embodiment will now be explained incorporating the clock signals as shown in FIG. 3.

A set of random numbers is transmitted from source 10 to binary counters 12–1 to 12–8. For exemplary purposes the numbers preset in the counters and shown in FIG. 2 are as follows. Binary counter 12–1 has a zero binary coded decimal; counter 12–2 has a one binary coded decmal; counter 12–3 has a two binary coded decimal; counter 12–4 has a twelve binary coded decimal; counter 12–5 has a three binary coded decimal; counter 12–6 has a four binary coded decimal; counter 12–7 has an eight binary coded decimal; and counter 12–8 has a nine binary coded decimal. A start maximization signal is received from the computer at time $T_0$ by line 32 (see FIG. 3C). At time $T_1$ line 34 provides a positive clock pulse (see FIG. 3A). These simultaneous positive signals change the state of flip-flop 30 resulting in a series of pulses at the positive clock rate to junction 38. Each positive clock pulse of FIG. 3A increases incremental pulse counter 40 and binary counters 12–1 to 12–8. When one of the binary counters is full, i.e., contains a binary coded decimal fifteen, an associated detector 18 will be enabled. In the preferred illustration, after three positive pulses, i.e., at time $T_5$, counter 12–4 has a binary coded decimal fifteen. Detector 18–4 associated with counter 12–4 is enabled changing its output from a binary ONE to a binary ZERO. This change of binary states causes gate 48 via junction 46 to change its output from a binary ZERO to a binary ONE, resulting in three concurrent but separate operations. First, flip-flop 30 is de-energized since it receives a binary ZERO signal via inverter 62, junction 64, line 36 at its reset position. With flip-flop 30 de-energized, junction 38 does not receive any further pulses (see FIG. 3D). Hence binary counters 12–1 to 12–8 and incremental pulse counter 40 have their numbers fixed. Second, flip-flop 54 receives an input signal via junction 50 and line 52 resulting in an output shown in FIG. 3E as occurring at time $T_7$. Third, shift register 22 is signaled via junction 50, inverter 62, junction 64 and one shot multivibrator 66. This signal results in cells 68–1 to 68–8 indicating the binary state of detectors 18–1 to 18–8 respectively, as is shown in FIG. 2.

At time $T_7$, gate 70 is enabled and provides pulses to junction 76 corresponding to each positive clock pulse received. The cells 68–1 to 68–8 holding the data of the detectors 18–1 to 18–8, respectively, are shifted one cell position for each pulse received from junction 76. If a ONE signal exists in cell 68–8 then gate 86 is energized via line 82 (see FIG. 3F). Gate 86 provides a pulse to address counter 88 which is originally set to a ZERO binary coded decimal. The signal stored in cell 68–7 is shifted one cell and hence transferred to cell 68–8. With the next positive clock pulse, cell 68–8 is again sampled and if it contains a ONE signal, a pulse is again provided to address counter 88 via gate 86. This continues until the signal of cell 68–4 associated with detector 18–4 is sampled. The binary ZERO signal of cell 68–4 will not provide a pulse to gate 86 and hence the address counter 88 will not be incremented. However, flip-flop 96 will be energized by the binary ZERO signal via line 84, junction 98 and line 100. On the negative portion of the clock pulse (see FIG. 3G at time $T_{14}$) flip-flop 96 will be enabled to provide a binary ZERO signal to gate 86 via line 94. This binary ZERO signal ensures that gate 86 does not transmit any further pulses to address counter 88. The number stored in address counter 88 identifies the source of the first highest number.

Shift counter 78 is also incremented with each pulse provided to junction 76. When the number in shift counter 78 is equal to the number of binary counters 12, i.e., after eight pulses, detector 80 transmits a signal via line 60 to the reset position of flip-flop 54 de-energizing the flip-flop and resulting in no further pulses to the shift register 22.

Gate 106 is energized by the binary ZERO from cell 68–8 via line 84, junction 98, and line 104. If another cell 68 contained a binary ZERO, then ambiguity counter 108 would be incremented again. Ambiguity counter 108 provides an output to detector 110. If the binary coded decimal of detector 110 is greater than one, transmission of the signal from address counter 88 is negated and an appropriate register (not shown) shows that no identification of the highest number is possible. If the ambiguity counter has a binary coded decimal equal to one, address counter 88 will be sampled and the source of the maximum number will then be displayed.

To obtain the value of the highest number, the output from incremental pulse counter 40 is transmitted to subtractor 42 which has been preset with the predetermined value which enables the detectors 18, i.e., in the preferred example, fifteen. Since three pulses were received by incremental pulse counter 40, the subtractor 42 would indicate that a binary coded decimal twelve was the highest preset number. Hence, it is known by address counter 88 that the source associated with cell 68–4 provided the highest number and by subtractor 42 that the original number generated from source 10 was twelve.

It is noted that the preferred illustration only deals with determining the highest number. However, the circuit is easily applicable to determining the lowest number. In this other embodiment, the binary counters 12 would be decremented. Detection would occur when a binary coded decimal equal to zero was sensed. The subtractor would be changed to an adder, etc. It is obvious that other modifications and variations for a lowest number detector could be implemented.

Refinements such as checking for the next extreme number and the difference between the extreme number and the next extreme number can be easily incorporated. One method to incorporate the refinement would be to start a second maximization signal and follow the same procedure as above to obtain the next extreme number. This number could be subtracted from the prior calculated number. If the difference is not greater than a predetermined amount, an ambiguity signal would be generated from ambiguity counter 108 via detector 110. Other refinements to provide the next extreme number are possible. Thus a signal for an input could be connected to flip-flop 30 to re-energize it thereby providing further pulses to binary counters 12–1 to 12–8. When a second detector 18–1 to 18–8 is enabled, the next extreme number is determined.

Additional enhancements are possible. Thus means for biasing the binary counters or changing the enabling level of some of the detectors may also be incorporated. In this alternative embodiment, each detector could have its own extreme level to start the technique previously described. Suitable changes with the extreme number value indicator could be made.

The invention has been described with particular reference to the preferred embodiment thereof, but it will be understood that variations and modifications can be effected within the spirit and scope of the invention.

What is claimed is:

1. In an apparatus for recognizing an unknown character including source means for generating a set of numbers, each number representing a correspondence between said unknown character and one of a plurality of known characters, a plurality of first counter means, each identified with one of said plurality of known characters, for receiving said set of numbers from said source means, first generating means for augmenting said set of numbers in each of said plurality of first counter means, and a plurality of first detector means, each responsive to one of said plurality of first counter means, for detecting a predetermined number in said plurality of first counter means, wherein the improvement in said apparatus comprises:

a plurality of storage means disposed in a shift register arrangement and coupled to said plurality of first detector means, each of said plurality of storage means storing a first binary state when a corresponding one of said plurality of first counter means has less than said predetermined number and a second binary state when said corresponding counter means has said predetermined number, means coupled to said plurality of first detector means for serially shifting the contents of each of said plurality of storage means, and address determination means coupled to said plurality of storage means for identifying one of said plurality of storage means having said second binary state.

2. An apparatus as defined in claim 1 wherein said address determination means comprises:

means coupled to a last ordered storage means in said shift register arrangempnt of said plurality of storage means for discerning said binary state in said last ordered storage means, second counter means coupled to said discerning means for counting the number of times said first binary state has been shifted to said last ordered storage means, and means coupled to said discerning means and responsive to said second binary state in said last ordered storage means for inhibiting said second counter means, said second counter means in response to said inhibiting means identifying said unknown character.

3. An apparatus as defined in claim 2 wherein said shifting means includes:

second generating means responsive to said plurality of first detecting means for sequencing said shift register arrangement, shift counter means responsive to said second generating means for counting the number of times said plurality of storage means has been shifted, and second detector means responsive to said shift counter means for resetting said second generating means, said second detector means enabling said second generating means to be reset when all of said plurality of storage means have been sampled.

4. An apparatus as defined in claim 3 and further including:

subtractor means coupled to said plurality of first counter means and responsive to said first generating means for computing the extreme binary number provided by said source means to said plurality of first counter means.

5. A method for determining an unknown character by comparison to a plurality of known characters, said method comprising the steps of:

presetting a set of binary numbers in a plurality of binary counters, each number representing a correspondence between said unknown character and one of said plurality of known characters, augmenting said set of binary numbers in each of said plurality of binary counters, detecting one of said plurality of first binary counters when said one counter has reached a predetermined number, storing a first binary signal in a plurality of storage means connected in a shift register arrangement for each of said plurality of binary counters having a binary number less than said predetermined number, storing a second binary signal in said plurality of storage means for each of said plurality of first binary counters having said predetermined number, serially shifting said binary signals of said plurality of storage means, sensing the binary signal in a last ordered storage means of said plurality of storage means, counting the number of times a first binary signal has been shifted to said last order storage means, and counting the number of times said binary signals have been shifted in said plurality of storage means, whereby the identity of the unknown character is determined from said numbers when a second binary signal is sensed in said last ordered storage means.

6. A method as defined in claim 5 and further comprising the steps of:

inhibiting said counting of said first binary signals when a second binary signal is sensed in said last ordered storage means, and inhibiting said counting of said binary signals when each of said plurality of storage means has been shifted to said last ordered storage means.

7. The method of claim 6 and further comprising the steps of:

counting the number of times said plurality of binary counters have been augmented, inhibiting said plurality of binary counters from being augmented when said predetermined value has been detected, and subtracting the number of times said plurality of binary counters have been augmented from said predetermined number.

* * * * *